United States Patent [19]

Mitchell

[11] Patent Number: 5,488,622
[45] Date of Patent: Jan. 30, 1996

[54] SIMPLIFIED DISPERSION EQUALIZATION FIELD COIL DESIGN FOR A MULTIOSCILLATOR RING LASER GYROSCOPE

[75] Inventor: Robert A. Mitchell, Woodland Hills, Calif.

[73] Assignee: Litton Systems, Inc., Woodland Hills, Calif.

[21] Appl. No.: 283,393

[22] Filed: Jul. 29, 1994

[51] Int. Cl.⁶ .................................................. H01S 3/00
[52] U.S. Cl. ................... 372/33; 372/37; 372/94
[58] Field of Search .................. 372/33, 37, 94

[56] References Cited

U.S. PATENT DOCUMENTS

| | | | |
|---|---|---|---|
| 4,246,549 | 1/1981 | Carter et al. | 372/27 |
| 4,968,136 | 11/1990 | Lim et al. | 372/99 |
| 5,137,358 | 8/1992 | Perkins | 372/107 |
| 5,157,462 | 10/1992 | Hahn | 372/94 |
| 5,196,905 | 3/1993 | Hahn et al. | 372/87 |
| 5,305,085 | 4/1994 | Hahn | 372/37 |
| 5,323,227 | 6/1994 | Martin | 372/32 |
| 5,371,591 | 12/1994 | Martin et al. | 372/94 |

*Primary Examiner*—Rodney B. Bovernick
*Assistant Examiner*—Robert E. Wise
*Attorney, Agent, or Firm*—Lewis B. Sternfels; Chester E. Martine; James F. Kirk

[57] ABSTRACT

At least one coil (32) is located on an exterior side face (30) of a frame (12) of a ring laser gyroscope (10) such that a significant component of the magnetic field generated by the coil is colinear with the plasma discharge of the gyroscope, and by which dispersion equalization of the gyroscope can be effected. The coil may be supported by a magnetically permeable annular bobbin (40), which is set about a mirror (26) on side face (30) and which may be partly set within grooves in the side face, to reduce the current necessary to effect dispersion equalization and to provide shielding of the mirror from the effects of tangential and transverse fields, and to increase the shielding effects for the mirror, both from Faraday rotator magnets (16) and from external magnetic fields. For those mirrors where no coils are present, the annular bobbins are used solely for their shielding properties.

12 Claims, 1 Drawing Sheet

U.S. Patent  Jan. 30, 1996  5,488,622
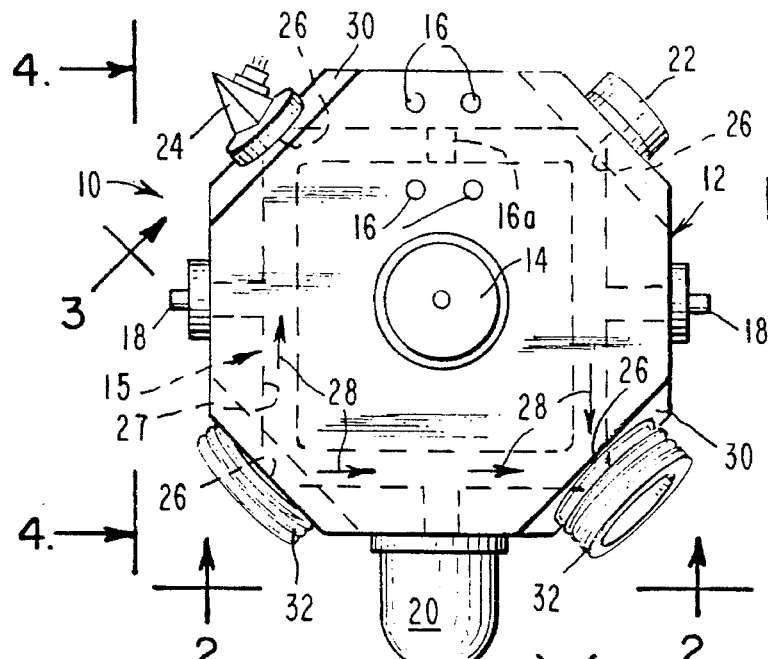
Fig. 1.
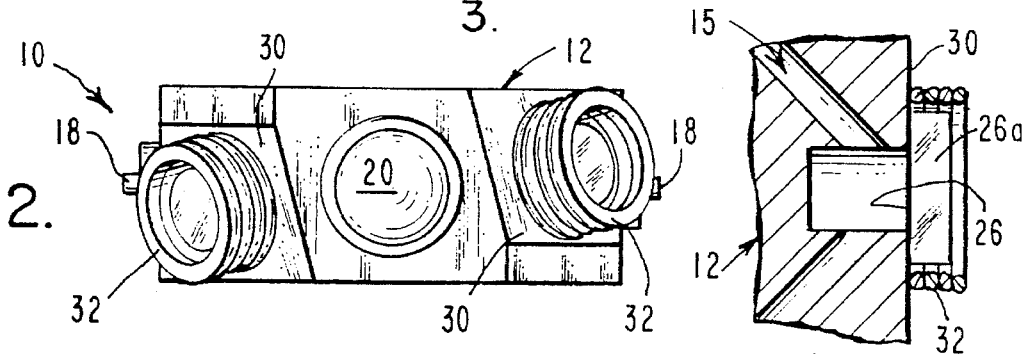
Fig. 2.
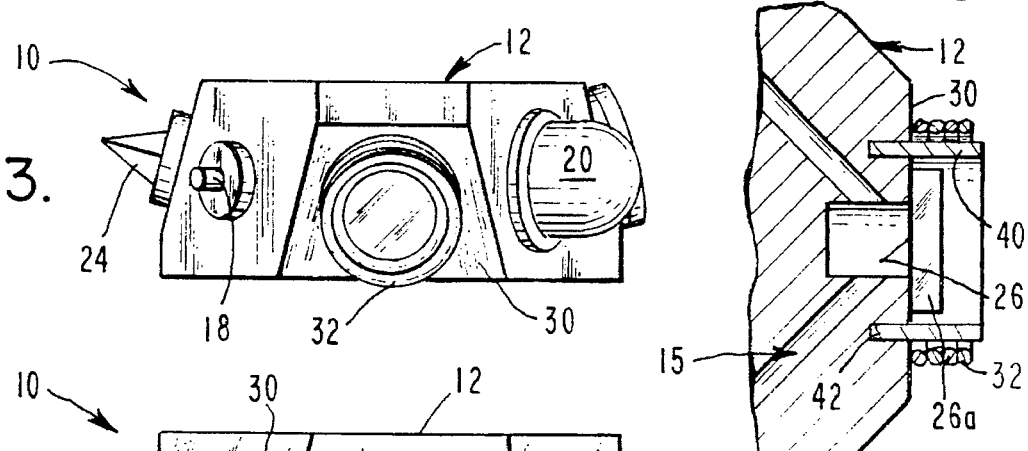
Fig. 3.
Fig. 5.
Fig. 6.
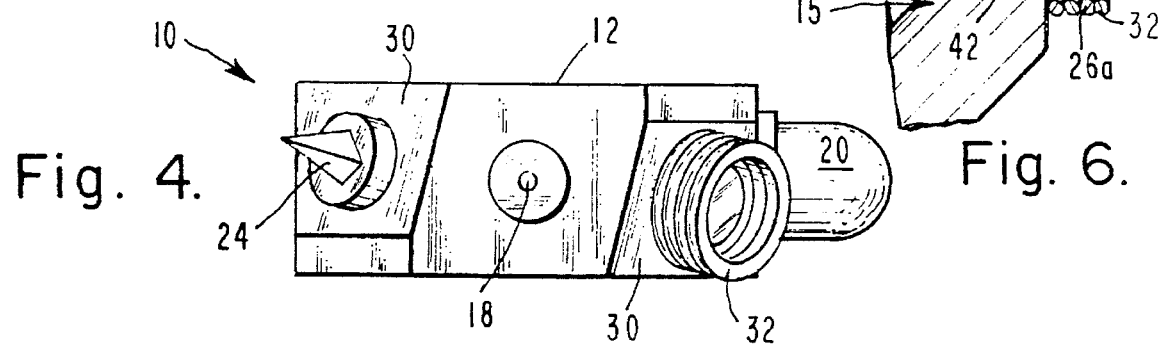
Fig. 4.

SIMPLIFIED DISPERSION EQUALIZATION FIELD COIL DESIGN FOR A MULTIOSCILLATOR RING LASER GYROSCOPE

BACKGROUND OF THE INVENTION

1. Field of the Invention

The present invention relates to multioscillator ring laser gyroscopes and, more particularly, to simplified dispersion equalization field coils therefor.

2. Description of Related Art and Other Considerations

Dispersion field coils in conventional multioscillator ring laser gyroscopes (RLG), such as described in U.S. Pat. No. 4,470,701, are used primarily to counteract undesirable magnetic fields produced by Faraday rotator magnets. Outside magnetic fields can also produce undesirable bias effects if the gyroscope is insufficiently shielded. Such coils are typically laced through holes in the frame of the gyroscope and surround its plasma discharge region. Specifically, the holes are drilled into the frame, which is composed of a glass having a low coefficient of thermal expansion, and the edges of the holes are bevelled or otherwise rounded to avoid damage to the insulation of the wires. The customary coil lacing process is effected manually by threading and winding the coil wires through the holes in the glass frame, and results in high assembly costs.

Mechanization of the above lacing process by use of a special coil winding machine has been investigated, but this option was rejected as adding cost to the gyroscope and placing it at a market disadvantage vis-a-vis competing products.

This existing coil design can also produce undesirable tangential or transverse magnetic fields, which could result in incorrect output readings. The coil windings, as presently installed, are designed to produce a magnetic dispersion field optimally aligned with the gain bore of the gyroscope, but may produce tangential fields at the mirror surfaces. Thus, the fields at the mirrors are not normal to their surfaces and, as a result, this may influence a gyroscope bias known as "transverse Kerr effect."

Further, the above described coil design does not easily allow for changes in the number of turns of wire, for whatever reason. For example, in the manufacture of a lot or number of gyroscopes having the same design, the entire lot needs to have essentially the same dispersion equalization current but, in practice, uniformity in dispersion equalization current does not occur. Therefore, those gyroscopes, which fail to be within tolerance, must be reworked by adding or subtracting turns of wire in their coils. The present design involving laced coils makes such changes in the coils difficult and expensive.

SUMMARY OF THE INVENTION

These and other problems are successfully addressed and overcome by the present invention by locating at least one coil on an exterior face or side of the gyroscope frame such that a significant component of the magnetic field generated by the coil is colinear with the plasma discharge in the gain bores of the gyroscope.

Several advantages are derived from this design. Primarily, the cost of manufacturing a ring laser gyroscope is decreased. The coil can be manufactured easily by a conventional coil winding machine; no unusual coil winding machinery is necessary. Thus, the need for drilling and rounding holes in the frame and for manually lacing the coil within the frame of the gyroscope is eliminated. Although the total number of turns for the coils may be somewhat higher than that for coils used in prior gyroscope assembly design, the ease of construction using mechanized winding machinery constitutes a very worthwhile tradeoff. The weight distribution is favorable as well, especially when more than one coil is used, because the frame tends to be heavier on the side opposite the coils. Selecting an appropriate wire gauge provides a significant amount of counterweight. If necessary, the coil can be readily replaced to provide a different coil design for a variety of dispersion current requirements. Such replacement avoids the previously mentioned problems relating to making the dispersion equalization current essentially the same for a manufactured lot of gyroscopes. Tangential and/or transverse magnetic fields induced by dispersion coils are minimized. The number of coil turns can be easily modified and/or tailored to accommodate the differing dispersion magnetic field requirements.

As a modification to the above discussed design in this summary, a magnetically permeable annular bobbin can be used to support the coil. The bobbin is set about a mirror on the frame exterior side face and may be partly set within grooves in the side face.

This arrangement provides several advantages. The current necessary to effect dispersion equalization is reduced. The mirror is shielded from the effects of tangential and transverse fields, both from Faraday rotator magnets and from external magnetic fields. For those mirrors where no coils are present, the annular bobbins are used solely for their shielding properties.

Other aims and advantages, as well as a more complete understanding of the present invention, will appear from the following explanation of exemplary embodiments and the accompanying drawings thereof.

BRIEF DESCRIPTION OF THE DRAWINGS

FIG. 1 is a top view of a preferred embodiment of the present invention, which illustrates a pair of coils secured to a pair of exterior faces on the frame of the gyroscope, although only one coil may be needed;

FIG. 2 is a front view of the embodiment shown in FIG. 1;

FIG. 3 is a view of the embodiment shown in FIG. 1 taken in a direction which is rotated 45° from that depicted in FIG. 2;

FIG. 4 is a side view of the embodiment illustrated in FIG. 1 taken in a direction which is further rotated another 45° from that previously depicted;

FIG. 5 is a cross-sectional side view of a portion of the optical path including a multilayer dielectric first surface mirror; and FIG. 6 is a cross-sectional view similar to that of FIG. 5, further illustrating a modification using a magnetically permeable annular bobbin supporting the coil.

DETAILED DESCRIPTION OF THE PREFERRED EMBODIMENTS

Accordingly, FIGS. 1–5 illustrate a ring laser gyroscope assembly 10, which is sometime referred to herein by the acronym "RLG" or "ZLG™" ("ZLG™" being a trademark adopted by Litton Industries for its version of assembly 10, as a "zero lock gyro"). Gyroscope assembly 10 includes a frame 12 which is mounted on a supporting center post 14, and which houses an optical path 15. The frame supports Faraday rotator magnets 16, a Faraday rotator element 16a, anodes 18, a cathode 20, a path length control (PLC) transducer 22, heterodyne prism assembly (HET P.D. ASSY) 24, preferably four first surface mirrors 26, and gain bores 27 which contain the plasma discharge. Mirrors 26 typically are composed of multilayer dielectric materials which are deposited on a substrate 26a in a thickness of several microns by conventional chemical or electrodeposition techniques, such as by sputtering. Such gain bores are only in that part of optical cavity 15 which lies in the lower portion of gyroscope assembly 10, as viewed in FIG. 1, and couple cathode 20 and anodes 18 together. Typically, frame 12 includes a plurality of angled sides 30 to which a path length control 22 transducer, heterodyne prism assembly 24 and mirrors 26 are positioned and affixed. The mirrors are not in the same plane but are located at the vertices of a tetrahedron. Gain bores 27 in frame 12 follow the same out of plane path along which the laser light travels. This path along which the laser light travels, as best seen in FIGS. 1 and 5, constitutes optical cavity 15 of gyroscope assembly 10, and includes mirrors 26, gain bores 27 and Faraday rotator element 16a, which is centered within the laser beam and magnets 16.

Unlike the placement of coils in pre-existing ring laser gyroscope assemblies, assembly 10 herein includes one or more coils 32 which are positioned respectively on one or more angled sides 30 and preferably surrounds mirrors 26 (see, in particular, FIG. 5). This design minimizes any induced magnetic field components which could contribute to gyroscope bias by the "transverse Kerr effect."

This design further enables easy replacement of coil 32 with another, or change in the number of the coil's windings. The number of windings in a coil may need to be increased or decreased to achieve dispersion equalization within a desired current range. With the present invention, the coil can be removed easily from frame 12 and reworked or replaced with another coil. It is also possible to rework the coil without it being removed from the frame, e.g., should only a decrease in the number of windings be necessary.

If a field is induced at either mirror 26 in the direction normal to its face, as shown by arrows 25, it can be considered as having separate magnetic field components (as designated by arrows 28) directed along gain bores 27. That field can be generated by coil 32 surrounding each mirror, as shown in FIGS. 1–5. Current would be made to flow in the proper directions for each coil 32 so as to produce the desired components 28 in gain bores 27 on opposite sides of gyroscope 10. No unusual or special coil winding machinery is necessary as was investigated prior to the present invention. The total number of turns may be somewhat higher for the coil or coils of the present invention than for the coils used in pre-existing ring laser gyroscope designs but, considering the ease of construction, it becomes a very worthwhile tradeoff. The weight distribution is favorable as well, because frame 12 tends to be heavier opposite the coils 32. Selecting an appropriate wire gauge provides a means for tailoring the amount of counterweight.

Experiments on the design of the present invention were conducted. There, coils 32 were bonded directly to frame 12 with a polyurethane adhesive. Large bonding areas were avoided to lessen stress transfer to the glass frame. The coils were made of lacquer coated 34 AWG magnet wire overcoated with epoxy resin for affixing the windings together. Each consisted of 200 turns wound on a 0.75 inch bobbin which was removed after the epoxy cured. Existing methods for automatic coil winding enabled better coil construction in comparison with manual winding methods.

In the experiments, two 18 cm gyroscopes were fitted with windings, generally as described and illustrated herein. Both performed as they had before being altered, with the exception that field current values increased slightly, as was expected. Both required approximately 35 milliamps for dispersion equalization which was within 20% of their premodification value. Operationally, the change was transparent. Coil resistance was approximately 1.3 times greater than with the standard windings. Calculated power dissipation at each mirror face was less than 15 milliwatts. A heavier wire gauge is usable for production models to minimize dissipation and facilitate frame mass balancing.

Referring now to FIG. 6, the structure previously described and illustrated is modified by the addition of a ring or annular bobbin 40 of magnetically permeable material, such as of soft iron or a magnetic shielding alloy. The use of annular bobbin 40 was found to reduce the current necessary to effect dispersion equalization by an amount of approximately 20%. It also provides shielding of mirrors 26 from the effects of tangential and transverse fields, e.g., transverse Kerr effect. Adding a groove 42 in frame 12 at sides 30, where the mirrors are positioned, further reduces dispersion equalization current and increases the shielding effects for the mirrors, both from the Faraday rotator magnets and from external magnetic fields. For those mirrors where no coils are present, the annular bobbins are used solely for their shielding properties.

Although the invention has been described with respect to particular embodiments thereof, it should be realized that various changes and modifications may be made therein without departing from the spirit and scope of the invention.

What is claimed is:

1. A multioscillator ring laser gyroscope including a frame having an exterior face, means for producing a plasma discharge in the optical cavity of said gyroscope, and at least one coil on said face and so positioned thereon that a significant component of the magnetic field generated by the coil is colinear with the plasma discharge in the optical cavity.

2. A gyroscope according to claim 1 in which said coil has a number of windings and is removably affixed to said face for enabling its replacement with a coil having a different number of windings in order to achieve dispersion equalization within a desired current range.

3. A gyroscope according to claim 1 in which said coil is so positioned on said face as to reduce induced tangential and transverse magnetic fields.

4. A gyroscope according to claim 1 further including Faraday rotator magnets mounted on said frame, and wherein said coil is so positioned on said face as to counter the effects of the Faraday rotator magnets and any magnetic fields external to said gyroscope.

5. A gyroscope according to claim 1 in which the positioning of said coil on said face enables the number of coil turns to be modified and thus to accommodate the magnetic field and, thereby, to facilitate a tailoring of the coils vis-a-vis surrounding gyroscopic magnetic fields.

6. A gyroscope according to claim 1 wherein said coil effects dispersion equalization, and further including an annular bobbin of magnetically permeable material positioned within and supporting said coil for reducing the dispersion equalization current requirements.

7. A gyroscope according to claim 6 further including a mirror surface on said frame exterior face, and wherein said coil is positioned about said mirror surface and is bonded to said exterior face.

8. A gyroscope according to claim 7 further including Faraday rotator magnets and means defining a groove in said frame exterior face and surrounding said mirror surface, for further reducing the dispersion equalization current and for shielding said mirror surface from both the Faraday rotator magnets and any external magnetic fields.

9. A gyroscope according to claim 1 further including a mirror surface on said frame exterior face, and wherein said coil is positioned about said mirror surface and is bonded to said exterior face.

10. A gyroscope according to claim 9 wherein said coil effects dispersion equalization, and further including an annular bobbin of magnetically permeable material positioned about said mirror surface and within and supporting said coil for reducing the dispersion equalization current requirements.

11. A gyroscope according to claim 10 further including means defining an annular groove positioned in said frame exterior face and surrounding said mirror surface, and wherein said annular bobbin is partially positioned within said groove means.

12. A multioscillator ring laser gyroscope including:

a frame having an exterior face;

a mirror surface on said frame exterior face;

means for producing a plasma discharge in the optical cavity of said gyroscope;

at least one coil removably affixed to said face and about said mirror surface and so positioned thereon to enable a significant component of the magnetic field generated by the coil to be colinear with the plasma discharge in the optical cavity, and to effect dispersion equalization, said coil having windings whose number can be varied in order to achieve the dispersion equalization within a desired current range;

means defining a groove in said frame exterior face and surrounding said mirror surface;

an annular bobbin of magnetically permeable material positioned partly within said groove means and supporting said coil for further reducing the dispersion equalization effects and for shielding said mirror surface from both the Faraday rotator magnets and any external magnetic fields.

* * * * *